Figure 1:
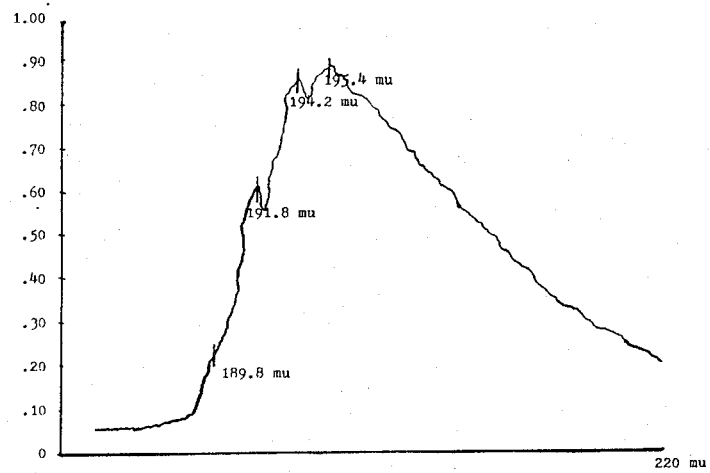
Figure 2:
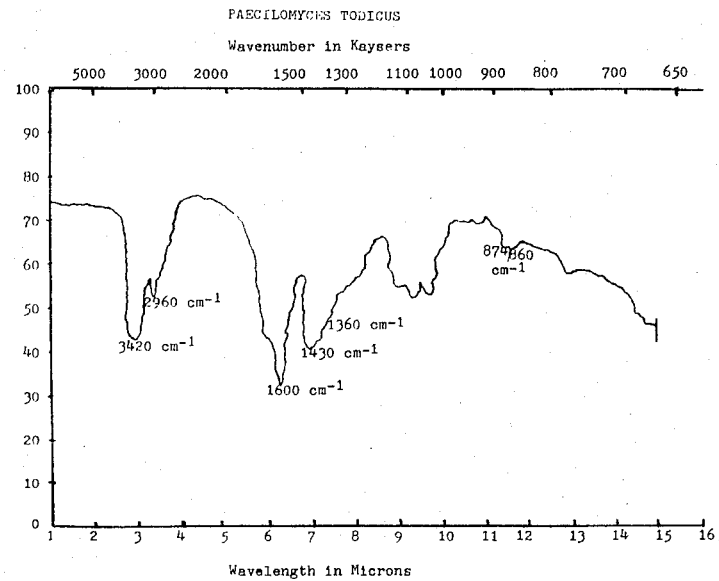

Inventor
BORIS SOKOLOFF
YOSHIHARU TODA

Feb. 7, 1967     B. SOKOLOFF ET AL     3,303,094
ANTIVIRUS ANTIBIOTIC FROM PAECILOMYCES TODICUS
AND METHOD OF PRODUCING SAME
Filed Aug. 27, 1962                3 Sheets-Sheet 2

FIG. 3            CHART 1

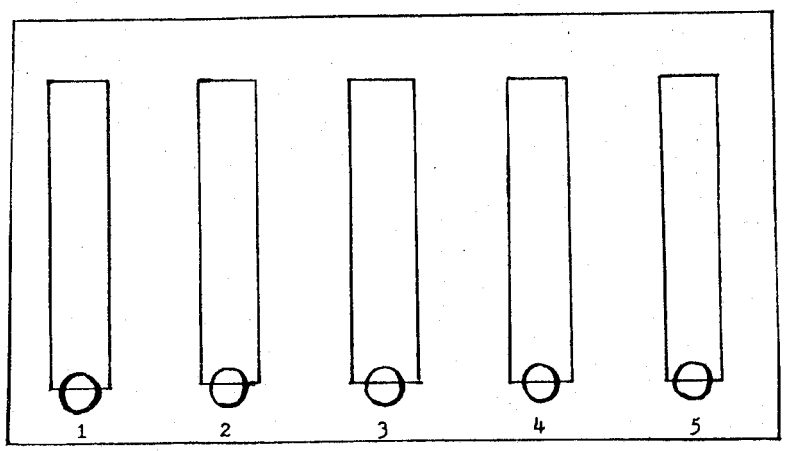

Solvent: $H_2O$. Developing Solvent: (1) Acetone; (2) Chloroform; (3) Ethyl alcohol; (4) Methyl alcohol; (5) Butyl alcohol.
Spot: 1% methylene blue alcohol solution, rinsed with alcohol. Detecting spot is not stained but background is stained blue.

FIG. 4     CHART 2

FIG. 5     CHART 3

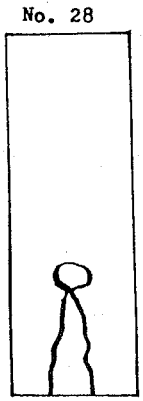

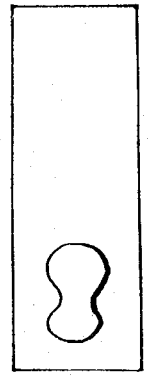

Method: Solvent: $H_2O$. Developing Solvent: Butyl alcohol 4 parts, glacial acetic acid 1 part, $H_2O$ 2 parts. Spot: Methylene blue.

Method: (1) Solvent: $H_2O$; (2) Developing solvent: Butyl alcohol 4 parts; Glacial acetic acid 1 part; $H_2O$ 2 parts; (3) Spot: 0.2% Ninhydrin solution.

Inventor
BORIS SOKOLOFF
YOSHIHARU TODA

By
Attorney

FIG. 6
CHART 4
MOUSE SARCOMA 180
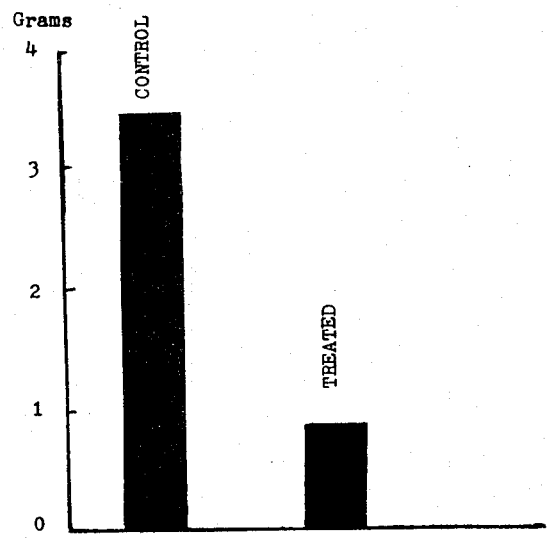
After 8 days, tumor weight in grams
CHART 5
EHRLICH MOUSE CARCINOMA
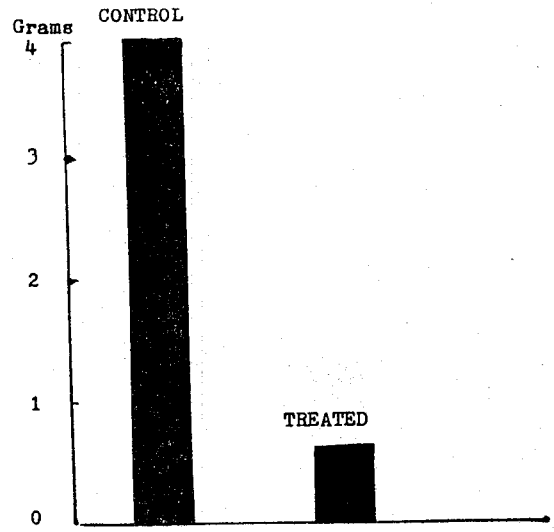
After 8 days, tumor weight in grams
FIG. 7

3,303,094
ANTIVIRUS ANTIBIOTIC FROM PAECILOMYCES
TODICUS AND METHOD OF PRODUCING SAME
Boris Sokoloff and Yoshiharu Toda, both of Florida
Southern College, Lakeland, Fla. 33803
Filed Aug. 27, 1962, Ser. No. 219,614
3 Claims. (Cl. 167—65)

This invention relates to a new and useful active antiviral antibiotic substance, isolated from a new species of the genus of Paecilomyces, and to the method of its extraction and purification.

Since the discovery of penicillin, many new antibiotics have been isolated and a number of them are being used in the treatment of infectious diseases. As yet no active antiviral antibiotic has been discovered. In our search for such an antibiotic, we investigated numerous fungi by the method of endobiosis in chick embryos. After having tested many fungi, we came across a mold which has shown a strong activity against influenza virus PR8 and influenza virus MF1, in embryonated eggs. After having isolated a crude antibiotic compound, it was tested in vivo in mice against the same viruses and also against the transplanted tumors mouse sarcoma 180 and Ehrlich mouse carcinoma. The antibiotic showed a strong inhibiting activity against transplanted tumors. This unique property of the antibiotic, to be active against both viruses and tumors indicates its potential usefulness, particularly in view of its low toxicity.

It is accordingly a fundamental object of this invention to provide antiviral, antitumor compound in useful form and a method of preparing it.

The antibiotic substance is obtained from a mold, originating in the Florida Everglades swamp, which we identified as belonging to the genus of Paecilomyces. Upon comparing the biological, morphological and chemical properties of other species of this genus, as described by Brown and Smith in their monograph on this genus, published in the Transactions of the British Mycological Society, 40:17–89, 1957, it was established that the mold, discovered by us, is a new one and differs from any other members of this genus. Accordingly, it was called *Paecilomyces todicus*, nov. species, and has been deposited with and is available from the Culture Collection Section, Fermentation Division, Southern Regional Research Laboratory, of the United States Department of Agriculture, and incorporated into the permanent culture collection of microorganisms as NRRL 2975.

The outstanding characteristics of the mold are:

Conidial fructification: Branched from curved hyphae consisting of separate sterigmatic cells. Sterigmata regularly distributed along the fertile hyphae.

Sterigmata: 5 to 15 microns by 2 microns with short tubes usually straight from the axis of the cells, diverged at the apices, bearing short chains of conidia.

Conidia: Oval, 3 to 5 by 1 to 2 microns, brown, a little rough-walled, swelling in germination to 5–6 microns and producing many tubes.

Heat resistance of spores: 60° C. for 15–20 minutes.

The mold does not grow on nutrient agar, brain-heart-infusion agar, Barnes' media, and corn-steep media.

The growth of it is increased remarkably by adding cornsteep water to synthetic media containing dextrose.

It prefers dextrose to saccharose.

It does not take lactose, adonit, sorbit, inosit, inulin, and dextrin as the sugars.

It grows both on acid and neutral media, but prefers acid media.

It produces yellow pigment of an extracellular nature, on various media. The colony is white to brownish-white. It is never colored greenish on any media.

Utilization of nitrogen: The surface growth of the mold is very thick on casein hydrolysate and corn-maize. The growth is very thin on bacto-asparagin, 1-proline and altryptophane. It almost does not grow on nutrient broth, polypeptone, neopeptone, soytone, yeast extract, brain-heart-infusion.

It grows best on the media containing: Glucose 40.0 gm.; $K_2HPO_4$, 1.0 gm.; $NaNO_3$, 3.0 gm.; $MgSO_4$, 0.5 gm.; KCl, 0.5 gm.; $FeSO_4$, 0.001 gm.; corn-maize, 10.0 ml.; water, 1000 ml.; pH 6.0–6.4.

There are considerable fluctuations in the pH during the fermentation period. With the initial pH of 6.0, it goes down to pH 3.5 on the fifth day and up to pH 6.0 on the 11th day, 7.0 on the 14th day. When the initial pH 6.8, it goes down to 4.2 on the 7th day and up to 6.8 on the 19th day.

Search for references related to the antibiotic produced by the genus Paecilomyces revealed several [Vora, V. A. Metabolic Products *Paecilomyces victoriae*. J. Sci. Ind. Research (India) 13B, 842–4, 1954.; Yonehara, H., Takeuchi, S., Umezawa, H. and Suzuki, Y. Variotin, a New Antifungal Antibiotic, produced by *Paecilomyces varioti* var. *antibioticus*. J. Antibiotics (Japan) Ser. A, 12, 109–10, 1959; Kenner, G. W. and Sheppard, R. C., α-aminoisobutyric acid, β-hydroxyleucine, and γ-methylproline from Hydrolysis of a Natural Product. Nature 181, 48, 1958.; Suzuki, S., Suganuma, A., Kishida, T., Misunoya, A., Ueda, F., Suzuki, Y., Kiji, I., Kyo, T., Takeuchi, M., Nakazawa S., Kishi N. and Tsumura, S., Activity of Variotin, A New Antifungal Antibiotic. J. Antibiotics (Japan) Ser. A 12, 244–8, 1959.; Saksena, S. B., A New Species of Paecilomyces from Soil, Journ. Indian Bot. Soc., 32 (4):186–189, 1953.]

M. Pisano, A. Fleischman, and M. Littman: Antibiotic Production by *Paecilomyces persicinus*. Antimicrobial Agents Annual, 1:41–7, 1960.

A. Fleischman and M. Pisano: The production of synnemartin B by *Paecilomyces persicinus* in a chemically defined medium. Antimicrobial Agents Annual, 1:48–53, 1960.

One of the antibiotics produced by the species of the Paecilomyces genus correspond in their biological activity to that of *Paecilomyces todicus*. As our tests, described below, have shown the antibiotic produced by *Paecilomyces todicus* has no activity against any microorganisms, either bacteria or fungi, while all the antibiotics produced by other species of the genus of Paecilomyces so far described are active against either bacteria of fungi.

The mold we have isolated is aerobic. It grows well both on the surface and immersed in a nutrient medium. Both the mycelium and the medium contain the active factor after a period of fermentation. The modified Czapek-Dox medium to which corn-maize was added served us for production of the antibiotic. On this liquid medium, the mold starts to grow after 24 hours, with the submerged mycelium reaching the surface. The optimal temperature is around 27 to 30° C. At 37° it grows somewhat faster in the beginning but soon the growth slows and is stopped. After growing for 10 days at the temperature of 27–30° C., the surface of the culture (around 200 cm.$^2$) is filled with mycelium. The surface is first white, then a few spaces of yellow colored material appear on the medium surface. The surface by that time is irregularly convex and concave.

The antibiotic is extracted from a 10–12 day old surface culture, but it can be isolated also from the culture media less or more aged. A diluted acetone (25–75%) is the most convenient method for the initial extraction of the active factor, although methanol or ethanol alcohols can be used also for this purpose.

The method of extraction is as follows:

The mycelium is macerated and extracted repeatedly with several times its volume of acetone (75–25%). Similarly, the medium is extracted. All the fractions obtained both from the mycelium extractions and medium extractions, are combined. The active factor is precipitated with $Ba(OH)_2$. The water extraction of $Ba(OH)_2$ precipitate is lyophilized, and the material is purified by repeated extractions with acetone and ethanol. Instead of lyophilization, the active factor can be separated from the Barium precipitate by extraction with dilute acetone, 25–40%, precipitated with 95% acetone, and washed several times with ethanol. Aluminum oxide might be used instead of $Ba(OH)_2$. The antibiotic so obtained is in the form of a powder of a yellowish color, soluble in water, diluted acetone, and alcohols.

In FIGURE I, we have shown the U.V. absorption curve, and

In FIGURE II we have shown wavelength plotted against absorption, for the powder Paper chromatography data on the antibiotic are summarized in FIGURES III, IV, V;

FIGURES VI and VII summarize some mouse test data.

With water as solvent, and acetone, chloroform, ethyl alcohol, methanol and butyl alcohol as developers, there was no actual development as is shown in FIGURE III.

Using water as solvent and as the developing agent: butyl alcohol 4 parts, glacial acetic acid 1 part and $H_2O$ 2 parts, and staining with 1% methylene blue, there was certain development as shown on FIGURE IV.

When water was used as solvent and the same developing agents were used but 0.2% ninhydrine was applied for spotting, a different development was recorded as shown on FIGURE V.

Identity tests giving clues to the chemical structure of the antibiotic are as follows:

TABLE I.—IDENTITY TESTS ON THE ANTIBIOTIC

| Reactions: | Results |
|---|---|
| Ninhydrin | + |
| Molisch's reaction | + |
| Vanillin and HCl | − |
| Quanibo (oxidized nitroprusside) | − |
| Keto-1-uronic acid | − |

The antibiotic was tested on various bacterial and molds with negative results. Table II summarizes the results.

TABLE II.—EFFECT OF THE ANTIBIOTIC ON BACTERIA AND FUNGI

| Doses | Microorganisms | | | | | |
|---|---|---|---|---|---|---|
| | E. coli | Proteus vulgaris | Pseudomonas aeruginosa | St. aureus | | Candida albicans |
| | | | | #3051 | #3010 | |
| 1 micro | + | + | + | + | + | + |
| 10 micros | + | + | + | + | + | + |
| 100 micros | + | + | + | + | + | + |
| 1.0 mg | + | + | + | + | + | + |
| 5.0 mg | + | + | + | + | + | + |

The results presented in Table II indicate that the antibiotic produced by Paecilomyces todicus exerts neither an antimicrobial or antifungal activity.

The antiviral activity of the antibiotic was tested first in embryonated eggs on influenza virus PR8 and on influenza A virus MF1.

The strain of influenza virus was suspended in nutrient broth at pH 7.0 and diluted by the 10-fold dilution method. The antibiotic was dissolved in distilled water at pH 7.0 at the rate of 0.1, 0.2 and 0.5 mg./0.1 ml. for testing. The virus suspension of each dilution was inoculated into the chorio-allantoic cavity of a ten-day-old chick embryo, and thereafter the antibiotic was injected into the same site of the embryonated eggs and incubated for 24 hours. After refrigerating over night, the chorio-allantoic fluids were pooled from each embryonated egg and titrated by the modified Salk pattern test. Table III summarizes the results of testing various batches of the antibiotic.

TABLE III.—THE ACTIVITY OF THE ANTIBIOTIC AGAINST INFLUENZA A VIRUSES PR8 AND MF1 IN EMBRYONATED EGGS

| Batches | Influenza Virus PR8—Doses | | | Influenza Virus MF1—Doses | | |
|---|---|---|---|---|---|---|
| | 0.1 mg. | 0.2 mg. | 0.5 mg. | 0.1 mg. | 0.2 mg. | 0.5 mg. |
| #25: | | | | | | |
| ID50 Control | 8> | | | | | |
| ID50 Treated | 6.5 | 6.32 | 6.0 | 6.2 | 6.1 | 5.8 |
| #28: | | | | | | |
| ID50 Control | 8> | | | | | |
| ID50 Treated | 6.2 | 5.83 | 5.34 | 6.0 | 5.75 | 5.4 |
| #29: | | | | | | |
| ID50 Control | 8> | | | | | |
| ID50 Treated | 5.6 | 5.3 | 5.0 | 5.9 | 5.5 | 5.1 |

Although there are some variations in the biological activity of the antibiotic against influenza viruses in eggs, usually present in any biological testing, there is a definite, well-pronounced activity against the two strains of Influenza A virus. While the control shows ID50 above 8 (8>), the ID50 for the treated eggs fluctuates between 6.5 and 5.0 depending on the dose administered.

The antibiotic cures mice infected with influenca A virus, PR8 and MF1. Influenza A virus PR8 and MF1 adapted to mouse lung infection through three passages was used. On the third day after the last passage, each infected lung with influenza virus was removed aseptically and macerated finely with sand in a small amount of Tyrode solution with penicillin. After centrifuging for ten minutes at 2000 r.p.m., the supernatant was separated from sediment and used for inoculation. Each mouse was inoculated intranasally with 4 drops of virus suspension under ether. Sixteen hours after virus infection, the antibiotic in various daily doses was injected intraperitoneally for four or five days. On the 14th day after virus inoculation, each surviving mouse was killed and the lungs removed individually. They were homogenated with sand and a small amount of phosphate buffer saline at pH 7.0. The homogenate was centrifuged for 10 minutes at 2000 r.p.m. and the supernatant was used for titration. The modified Salk pattern test was used with 0.5% chick blood cell suspension. The results of treatment of the infected mice are summarized in Table IV.

the treatment began. The results are shown on FIGURE VII. The average weight for the control group was 3.9 gm., for the treated group: 0.5 gm.

What is claimed is:

1. An antiviral material produced by the process of fermentation of a culture of Paecilomyces todicus, nov. sp. NRRL 2975, in a nutrient medium under aerobic conditions, said material being a water-soluble, powder of a light yellow color, said material being extracted from the mycelium and medium by means of acetone and recovered from the acetone extract by barium hydroxide precipitation.

TABLE IV.—ACTIVITY OF THE ANTIBIOTIC AGAINST INFLUENZA A VIRUS, PR8 AND MF1 IN MICE

| Virus | Dose Total | Mortality Rate, Percent | Infectivity Rate, Percent |
|---|---|---|---|
| Influenza A virus PR8: | | | |
| Control | | 100 | 100 |
| Treated | 6.0 mg./mouse in 4 days. | 50 | 50 |
| Control | | 100 | 100 |
| Treated | 8.0 mg./mouse in 4 days. | 25 | 25 |
| Control | | 100 | 100 |
| Treated | 10.0 mg./mouse in 4 days. | 10 | 10 |
| Influenza A virus MF1: | | | |
| Control | | 100 | 100 |
| Treated | 6.0 mg./mouse in 4 days. | 55 | 55 |
| Control | | 100 | 100 |
| Treated | 8.0 mg./mouse in 4 days. | 30 | 30 |
| Control | | 95 | 95 |
| Treated | 10.0 mg./mouse in 5 days. | 12.5 | 12.5 |
| Control | | 95 | 95 |
| Treated | 12.0 mg./mouse in 5 days. | 7.5 | 7.5 |

The mice cured from influenza with the antibiotic showed to be immune against the infection with the same strain of virus.

The antibiotic exerts a strong tumor inhibiting activity. The usual standard method for testing tumor inhibition was used. The mice, 24, 48, or 72 hours after the tumor was transplanted, were given the antibiotic, injected intraperitoneally for seven days, with the control group without any treatment. On the ninth day after tumor transplantation, all tumors, in the treated and control groups, were removed, and their weight recorded. The average tumor weight of the treated group was compared with the control tumor.

The following examples illustrate antitumor activity of the antibiotic.

Thirty mice, males, weighing average 20.5 gm. were divided into two groups of fifteen animals each. One group served as control and the other group was given the antibiotic. To all mice, sarcoma 180 was transplanted and 48 hours after transplantation, the treatment was started. It continued for 7 days, with the total dose of antibiotic given of 14 mg. or 700.0 mg./kg. wt./mouse. On the ninth day, all the tumors were removed and weighed. The average weight in the control group was 3.44 gm., in the treated group 0.65 gm. as shown on FIGURE VI.

To another thirty mice, Ehrlich mouse carcinoma was transplanted and when the transplant was 48 hours old, 2. Process for the production of antiviral substance which comprises, under aerobic conditions, cultivating a culture of Paecilomyces todicus nov. sp. NRRL 2975 at temperature of 15 to 40° C. in an aqueous nutrient medium containing sources of assimilable nitrogen and carbon and then extracting the mycelium and medium with acetone, precipitating active factors from the acetone extract with $Ba(OH)_2$, extracting the precipitate with a solvent comprising water, lyophilizing the aqueous extract and extracting the lyophilized product with a solvent comprising acetone, to leave a yellow powder residue of antiviral substance.

3. Process for the production of antiviral substance which comprises, under aerobic conditions, growing a culture of Paecilomyces todicus nov. sp. NRRL 2975 at a temperature of 15 to 40° C. in an aqueous nutrient medium containing sources of assimilable nitrogen and carbon, with essential minerals added, and then extracting the mycelium and medium with acetone, precipitating active factors from the acetone extract with $Ba(OH)_2$, and extracting the precipitate with water and acetone, to obtain a yellow powder residue of antiviral substance.

No references cited.

SAM ROSEN, *Primary Examiner.*

JULIAN S. LEVITT, *Examiner.*